United States Patent

Burrus et al.

[15] 3,654,458
[45] Apr. 4, 1972

[54] MEANS FOR DETECTION AND CONTROL OF LIQUID LEVEL IN A VESSEL

[72] Inventors: Bill S. Burrus; John B. Rosso, both of Tulsa, Okla.

[73] Assignee: Combustion Engineering, Inc., New York, N.Y.

[22] Filed: Jan. 6, 1969

[21] Appl. No.: 789,179

[52] U.S. Cl. .................................. 250/43.5 FL, 250/43.5 D
[51] Int. Cl. ..................................................... G01n 23/10
[58] Field of Search ............................... 250/43.5 D, 43.5 FL

[56] References Cited

UNITED STATES PATENTS

| 2,972,050 | 2/1961 | Allen | 250/43.5 FL |
| 2,981,841 | 4/1961 | Wheeler | 250/43.5 FL |
| 2,662,985 | 12/1953 | Good | 250/43.5 FL |
| 3,230,363 | 1/1966 | Prellwitz | 250/43.5 FL |

FOREIGN PATENTS OR APPLICATIONS

| 1,094,475 | 12/1960 | Germany | 250/43.5 |

*Primary Examiner*—Archie R. Borchelt
*Attorney*—Arthur L. Wade

[57] ABSTRACT

A vessel has a source and detectors of radiation emplaced within containers extended through its walls so the level of a fluid within the vessel will be detected by interference of the fluid with the reception of the radiation by the detectors.

3 Claims, 3 Drawing Figures

PATENTED APR 4 1972  3,654,458
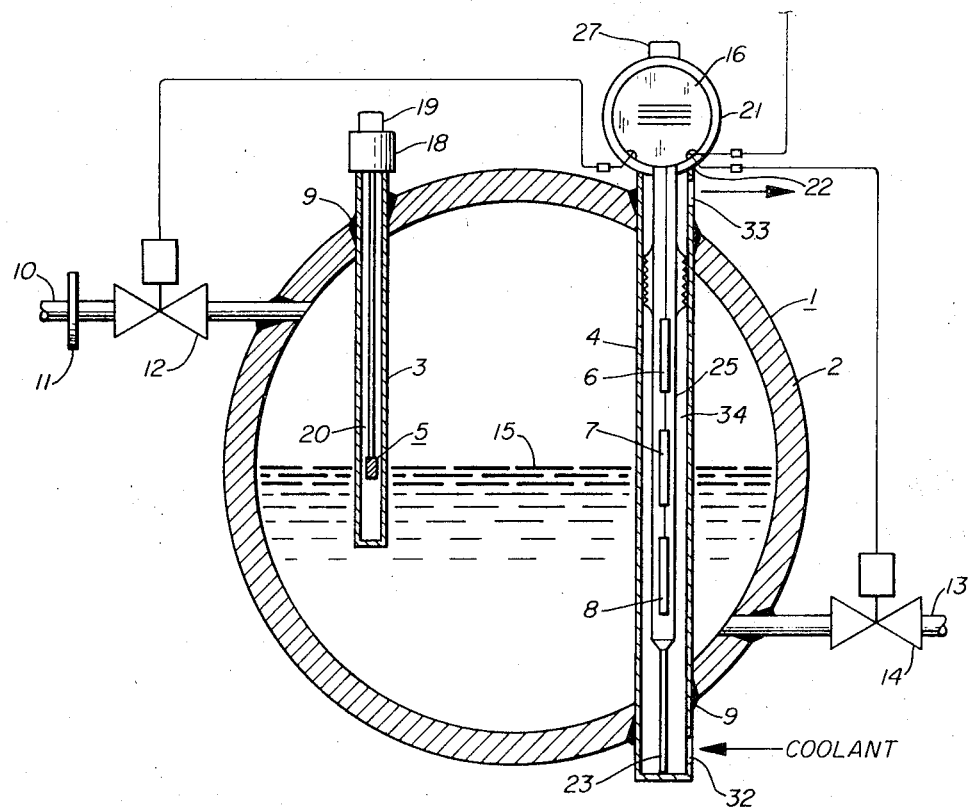
Fig. 1.
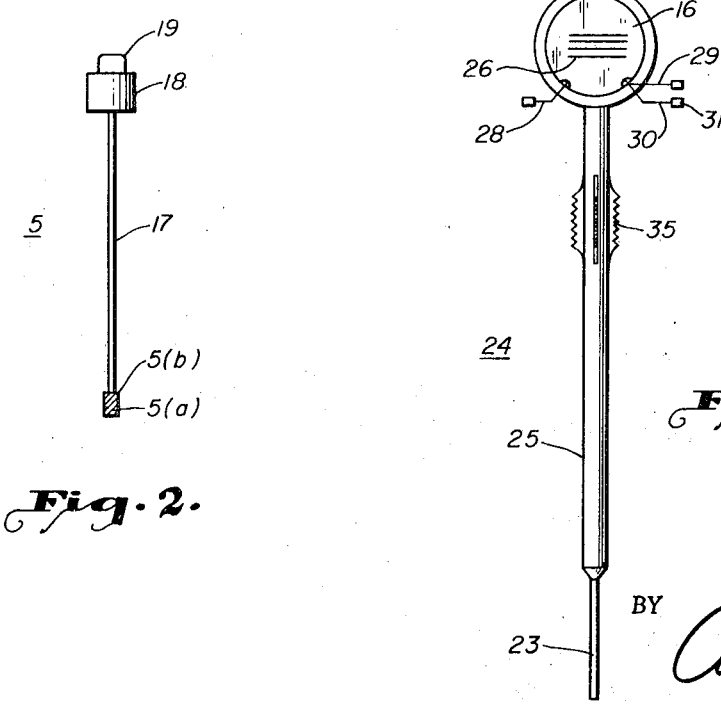
Fig. 2.
Fig. 3.
INVENTORS.
BILL S. BURRUS
JOHN B. ROSSO
BY Arthur L Wade
ATTORNEY

MEANS FOR DETECTION AND CONTROL OF LIQUID LEVEL IN A VESSEL

BACKGROUND OF THE INVENTION

1. Field of the Invention

The present invention relates to mounting a radiation source and detector within a container in a closed vessel so the level of a fluid within the vessel can be detected for manifestation and/or control. More particularly, the invention relates to a structure and arrangement whereby a source of radiation and one or more detectors of the radiation can be inserted into a thin-walled container, in turn mounted in a thick-walled vessel, for detection and control of the fluid level within the vessel. The source and detector assemblies can be removed from their containers for repair, service and replacement without opening the vessel.

2. Description of the Prior Art

The oil industry is on the threshold of the initial separation, at subsea locations, of subsea oil well production. Until now, marine oil well production has been brought to the surface for field processing prior to transportation by pipeline to distant points for final preparation for its use. As subsea wells are produced at depths below 150 feet, conducting the oil well production to the surface creates a large number of problems not present at the shallower depths; for example, pressure reductions and heat loss in well fluids may cause hydrate formation in flow lines. An analysis of these environmental problems of subsea production and field processing was made in U.S. Pat. No. 3,550,385.

Consequently, current deep-water production technology requires that at least the initial separation process (i.e., of the liquid and vapor phases) of wells produced from depths below approximately 150 feet be accomplished in vessels situated at or near the marine wellhead or on subsurface producing platforms. These vessels must be able to operate at depths of at least 1,000 feet. One of the requirements of this equipment is that the levels of the fluids produced through the vessels be sensed and manifested for control action to be taken which will affect the levels.

There is obvious difficulty in using most of the level detection and control devices developed for land-based production equipment in subsea installations. Many of them use gas as an energy source, and operation of gas-powered devices designed for surface use at the subsea depths under consideration requires extensive modification. However, radiation-type level controls can be successfully used under such conditions without extensive modification.

Level controls using radioactive energy have long been known in the art. Their use is disclosed in at least U.S. Pat. Nos. 2,565,963 issued Aug. 28, 1951, and 2,734,136 issued Feb. 7, 1956. Illustrative and well-explained commercial applications are disclosed in the produce catalog of IN-VAL-CO, a division of Combustion Engineering, Inc., Tulsa, Oklahoma, at pages 143, 144, 201, and 202.

SUMMARY OF THE INVENTION

A principal object of the invention is to provide an improved mounting system for a radiation level detector within a thick-walled vessel in which liquid has a level to be detected and manifested and/or controlled.

Another object is to provide an improved manner of installation and removal of the radioactive source and detector elements within a vessel without opening the vessel.

Another object is to provide increased protection of the source from marine growth and the chemical properties of fluids outside the vessel.

Another object is to more efficiently heat exchange the detector elements with fluids outside the vessel to prevent their overheating from the fluids within the vessel.

The invention contemplates at least two containers extended through the tank walls of a vessel containing fluid whose level is to be detected. The containers have a source of radiation mounted in one of them and a detector element mounted in the other. The fluid rises until it partially shields one or more of the detectors from the radiation of the source. The level is thereby sensed and manifested by a responsive circuit including the detectors.

The radiation source and detector elements within the containers extended through the walls of the vessel are not in communication with the interior of the vessel except through the radiation of the source. Therefore, the source and the detectors can be inserted in and removed from their containers without opening the vessel.

The invention also contemplates the source container being filled with a substance which will obviate contact between the radioactive source and deleterious fluids external the container while resisting the large working pressures usually present within the vessel.

Also, conduits in the detector container communicating with the fluids external the vessel provide a path for convection circulation of the external fluids, the heated fluids of the container generating the circulation.

Other objects, advantages and features of this invention will become apparent to one skilled in the art upon consideration of the written specification, appended claims, and attached drawings, wherein;

FIG. 1 is a cross-sectioned elevation of a vessel and level control embodying the invention, together with the electrical system for indicating, recording, and controlling the liquid level in the sealed container;

FIG. 2 is an elevation view of the radiation source assembly as it appears when not in place in its container in a vessel; and FIG. 3 is an elevation view of the detector/electronics assembly as it appears when not in place in its container in vessel.

DESCRIPTION OF THE PREFERRED EMBODIMENT

The Operating Situation

The most obvious environment for the present invention is now beneath the surface of a body of water. The most practical use for the invention is in detection and manifestation of liquid levels within tanks or pressure vessels into which oil wells are produced.

Heretofore, subsea oil wells have been produced into vessels mounted at or above the marine surface. Now that wells in water 150 feet deep, and foreseeably much deeper, are to be produced, the vessels initially receiving the production must be located below the surface. Such vessels may be mounted subsurface on a platform deck or on the marine bottom at the wellhead.

Vessels initially receiving the well production must be thick-walled to hold the high pressure reservoir fluids produced into them. The thicknesses required are too great to be penetrated with a standard intensity radioactive source material used for sensing the level of liquids within a container. The disadvantages of using source material in a level control device "hot" enough to penetrate a 4-to-6 inch steel wall of such a vessel are apparent.

The Flow Pattern

The drawing of FIG. 1 discloses how the invention solves the problem of constructively positioning a source and detector of radiation within a vessel for detection of the level of liquid within the vessel. The vessel 1 is cylindrical, the view being a cross-section in elevation.

The vessel wall 2 is shown as being relatively thick, too thick for a radioactive source of acceptably low intensity to be used to penetrate the wall and sense the level. Thus containers 3, 4 of a suitable thin-walled material penetrate thick wall 2 and receive the radiation source assembly 5 and detector elements 6, 7, 8 within the vessel. It is expected that operators will deal routinely with pressures of 2,000 psi in vessel 1, requiring vessel wall thicknesses of 4 to 6 inches, depending on the vessel diameter. Furthermore, improved fabrication methods may allow them greater wall thickness and thus larger diameter vessels. However, in the arrangement disclosed, wall thicknesses of only c. 0.6 inches in containers 3, 4 need be provided for container diameters of 3 to 4 inches to withstand the pressure in the vessel. Containers 3, 4 are disclosed securely welded at intersections 9 with the vessel shell to prevent all leakage of vessel contents to the atmosphere (i.e., the sea in the proposed subsea installation).

Produced well fluids enter the vessel 1 through conduit 10 ordinarily at a pressure significantly higher than the working pressure of the vessel. Choke 11 is shown to illustrate a manner in which the pressure of the conduit 10 fluids, and therefore the pressure within vessel 1 is regulated. The fluids then pass through remote-actuated valve 12 at a predetermined rate. Processed fluids exit the vessel through conduit 13 as controlled by remote-actuated valve 14.

Numeral 15 illustrates the interfacial zone, herein noted as the "liquid" level to be controlled, between fluids in the vapor phase and fluids in the liquid phase. Optimum process conditions are achieved when this level is fixed and held at some predetermined height in the vessel. Detector 7 is shown in position to maintain this level by generating more or less current through electronic network 16 as the level falls or rises from the desired position at 15. Detector 7 is referred to as the normal level controller.

Detectors 6, 8 are high level and low level controls, respectively. If the level becomes too high or too low in the vessel, the decrease or increase in current to network 16 can signal an alarm and conduct a supervisory function, and valves 12, 14 will isolate the intake or exit functions as required. Valves 12, 14 are, of course, well-known throttling type valves, and minor fluctuations in the level 15 are adjusted by the throttling open or closed of valve 12 or valve 14, as required. Detectors 6, 7, 8 are the well-known Geiger-Mueller type gamma particle counters.

It is noted that various arrangements of the source and detectors can be made with respect to each other, the vessel wall, and the liquid level. For examples, the detectors could be horizontally extended, or could be situated immediately adjacent the shell wall. The technique of variable gamma ray stimulation of the G-M counters proportional to varying level 15 positions--all within the art of level detection with radiation devices--is described in the special instance of a thick-walled vessel with thin-walled source and detector containers inside the vessel but preserved from its contents.

In combination with a radiation-type measurement and control device, the preferred mode depicted in the drawings incorporates the invention as disclosed below.

The Source:

FIG. 2 illustrates the radiation source assembly 5. It consists of a radioactive material 5 $a$ and suitable shielding 5 $b$, a spacing and support rod 17, a weighted collar structure 18, and handle 19. In this embodiment, structure 18 is strictly to limit the travel of source 5 $a$ in its container 3, i.e., the collar is not threaded and is without lugs or seats or O-rings to lock or seal with the container 3 opening. The weight of the source unit holds the unit in place in its container, thus providing the maximum in simplicity and ease of emplacement and removal. Of course, if it were desired, a lock arrangement could easily be provided between head 18 and the opening of container 3 with, for example, a connector such as disclosed in my U.S. Pat. No. 3,545,490.

The Protection of the Source:

Since the vessel of FIG. 1 is shown at a subsurface location in the sea, and since the collar to container connection does not of itself isolate or protect the source assembly 5 or the internal of container 3, it is necessary to provide this protection from destructive marine life and chemical action in another manner. Thus, the container 3 is filled with a material to occupy the annulus 20 between 5 and 3. This material is heavier than water, insoluble in water, non-corrosive, and inimical to marine life. Many such materials of liquid or plastic state exist, e.g., various silicone liquids and petroleum greases. After filling container 3, assembly 5 is merely lowered into place into container 3. Source assembly 5 may be removed and reinserted without adding new material to the container 3 each time, as reinsertion of unit 5 will merely displace the amount of water allowed to enter when unit 5 was withdrawn.

The Detectors:

The housing 21 for network 16 is designed to join the container 4 upper opening 22 in the same manner as disclosed in the second paragraph above for the collar 18 container 3 union. Added support is provided by leg 23. Leg 23 is also adjustable in length to vary the location of detectors 6, 7, 8 and thus the height of fluid level 15 desired to be held within vessel 1.

FIG. 3 illustrates the detector elements assembly 24. It consists of a case 25 for the G-M counters. There may be one or more counters arranged within the case 25, depending on the number of signalling and control functions desired. FIG. 1 shows a set of three detectors to control high, low, and normal level. Any one or two of these functions may be present alone, depending on design specifications. Cooling vanes or ports 26 are shown for dissipation of the heat of the power source within electronic network 16. The network 16 is known in the art of level control by radioactive means and so is not disclosed. A suitable handle 27 is provided. Lead wires 28, 29, 30 of network 16 exit housing 21 for control of input valve 12, for surface manifestation and override controls, and for control of output valve 14, respectively. The connector clips 31 permit underwater wiring connections without wetting or fouling the terminals of the leads, and can be of the type supplied by Electro Oceanics, Compton, California.

The Protection of the Detector:

A prime requirement of the operating environment for a radioactive level control system is that detector elements of the Geiger-Mueller type be operated below the temperatures expected in the vessel 1. Although gamma ray emission is independent of temperature, the detectors exhibit the so-called "avalanche effect" in current discharge when their temperature is excessive. Temperatures in the vessel may be expected to be commonly 180°–220° F. A heat exchange between the detectors and the atmosphere (sea water) is provided by flow of the cooler water through container 4. Openings 32, 33 are provided for entrance and exit of the water, and the conduit 34 carries this flow through container 4. Conduit 34 is formed as the container 4 wall/case 25 annulus. Flow through conduit 34 is a convection current generated by the temperature difference between the heated container wall and the cooler sea. A centralizer 35 is fixed to case 25 to insure conduit 34 remains effectively open should leg 23 be extended (as to adjust the detectors' position) so that housing 21 did not rest upon the opening 22 of the container 4.

Prevention of marine growth and deleterious chemical action on the container 4/case 25 structure is necessary. The heat present in vessel 1 should prevent damage from marine life, and a suitable coating or corrosion-proof metal will be used in the container 4 and case 25 to minimize corrosive chemical action.

Conclusion

It is seen that the preferred embodiment of the invention will provide a reliable level detection, manifestation, and control means for subsea oil field process vessels. This embodiment therefore combines a means without moving parts and free from the many difficulties of mechanical systems in a system wherein numerous advantageous and novel features reside, to wit:

1. a radiation-type level control system may be employed;

2. the emplacement and removal of the source and detector assemblies from the vessel is highly simplified;

3. the vessel is not opened to service or replace the level controls, and the source and detector assemblies can be handled separately;

4. the level controls and their containers are well protected from the harmful subsea environment;

5. the wall thickness of the vessel is not penetrated by the radiation of the source assembly, thus minimizing the radioactive mass employed in the level control system;

6. cooling of the detector assembly is provided by natural convection currents in the ambient environment, and without installation of pumps or power sources;

7. automatic high and low shutdown controls are provided which do not require continuous surface monitoring;

8. a unitary electronics network and power source can be surface-calibrated and installed at the subsea location;

9. the electronics network and detector elements assembly can be pressure tested as one unit at the surface;

10. the positions of the levels desired can be adjusted underwater; and 11. present submarine vehicles can easily accomplish all emplacement and removal tasks.

It is emphasized that this level control system can be employed in any subsea vessel in which it is desired to observe and/or control the liquid levels, provided the gamma ray emission from the source matter does not itself contaminate the vessel contents.

This system could well be employed on surface vessels, with the cooling of the detector elements accomplished by either the air of the atmosphere, or by a heat exchange medium circulated about the detector assembly through the container openings by suitable pump means.

In addition, other configurations of the source-detector arrangement could certainly be made within the scope of this invention. It is important only that the detectors respond in some direct way to the emissions from the source to control the fluid level.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter set forth above or shown in the accompanying drawings is to be interpreted as illustrative and not in a limiting sense.

The invention having been described, what is claimed is:

1. A level detector system for a vessel containing fluid, including,
   a first container arranged to extend through a section of the vessel wall and having its interior accessible from the exterior of the vessel,
   a source of radiation mounted within the first container,
   a second container arranged to extend through a section of the vessel walls so that its external surface intersects the level of fluid within the vessel and its interior is accessible from exterior of the vessel,
   a detector of the radiation of the source mounted within the second container at a position where the radiation will be at least partially shielded by the fluid within the vessel at a predetermined level of the fluid in the vessel so that the detector responds to the radiation of the source to indicate the level of the fluid in the vessel,
   and the second container arranged so that its interior is exposed at each end to the ambient fluids of the environment which is external to the system to cause convection currents of said fluids through the length of the second container for cooling the radiation detector.

2. The system of claim 1 in which,
   the detector of the radiation mounted within the second container consists of a plurality of detectors spaced in linear relation to one another and at a predetermined distance one from another, and in which
   circuits responsive to the electrical energy generated by the detectors in response to the radiation received are provided to indicate the change of the level of fluids in the vessel.

3. The system of claim 1 including,
   a selected protective material within the first container and disposed about the radiation source assembly as protection from the deleterious effects thereupon of the ambient fluids of the environment which is external to the system.

* * * * *

UNITED STATES PATENT OFFICE
CERTIFICATE OF CORRECTION

Patent No. 3,654,458          Dated April 4, 1972

Inventor(s) Bill S. Burrus et al

It is certified that error appears in the above-identified patent and that said Letters Patent are hereby corrected as shown below:

Column 1, line 54, "produce" should read -- product --; column 3, line 62, "3,545,490" should read -- 3,458,218 --.

Signed and sealed this 19th day of December 1972.

(SEAL)
Attest:

EDWARD M. FLETCHER, JR.         ROBERT GOTTSCHALK
Attesting Officer               Commissioner of Patents